US012634079B2

(12) United States Patent　　　　　(10) Patent No.:　US 12,634,079 B2
Zhou et al.　　　　　　　　　　　　　(45) Date of Patent:　　May 19, 2026

(54) METHOD AND APPARATUS FOR PROCESSING DOWNLINK REFERENCE SIGNAL, AND READABLE STORAGE MEDIUM

(71) Applicant: Spreadtrum Communications (Shanghai) Co., Ltd., Shanghai (CN)

(72) Inventors: Huayu Zhou, Shanghai (CN); Zhengang Pan, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 641 days.

(21) Appl. No.: 17/917,939

(22) PCT Filed: Apr. 9, 2021

(86) PCT No.: PCT/CN2021/086261
　　§ 371 (c)(1),
　　(2) Date: Oct. 9, 2022

(87) PCT Pub. No.: WO2021/204266
　　PCT Pub. Date: Oct. 14, 2021

(65) Prior Publication Data
　　US 2023/0155777 A1　　May 18, 2023

(30) Foreign Application Priority Data
　　Apr. 10, 2020　(CN) .......................... 202010281550.0

(51) Int. Cl.
　　*H04L 5/00*　　　　(2006.01)
　　*H04W 24/08*　　　(2009.01)
　　(Continued)
(52) U.S. Cl.
　　CPC ........... *H04L 5/0051* (2013.01); *H04W 24/08* (2013.01); *H04W 72/0446* (2013.01)

(58) Field of Classification Search
　　CPC .. H04L 5/0051; H04W 24/08; H04W 72/0446
　　See application file for complete search history.

(56) References Cited

U.S. PATENT DOCUMENTS

2014/0369279 A1* 12/2014 Yu ........................ H04B 7/0639
2017/0289818 A1 　 10/2017 Ng et al.
　　　　　　　　　　　(Continued)

FOREIGN PATENT DOCUMENTS

CN　　　　104349460 A　　2/2015
CN　　　　107404370 A　　11/2017
　　　　　　　　　　(Continued)

OTHER PUBLICATIONS

The first Office Action received in the corresponding Chinese Application 202010280900.1, mailed Sep. 19, 2022.
　　　　　　　　　　(Continued)

*Primary Examiner* — Ronald B Abelson
(74) *Attorney, Agent, or Firm* — Kilpatrick Townsend & Stockton LLP

(57)　　　　　　ABSTRACT

Embodiments of the present disclosure provide a method and apparatus for processing a downlink reference signal, and a readable storage medium, where the method includes: determining whether a downlink reference signal is valid by determining whether a UE is configured to monitor a first type PDCCH, or, by receiving a time-domain resource occupied by a downlink signal or monitoring a time-domain resource occupied by a PDCCH or a synchronization signal block, determining whether the downlink reference signal is valid according to the time-domain resource of the received downlink signal or the monitored PDCCH or the monitored synchronization signal block, and a time-domain resource occupied by the downlink reference signal configured by a high-layer signaling.

17 Claims, 3 Drawing Sheets

(51) Int. Cl.
  *H04W 72/04*      (2023.01)
  *H04W 72/0446*    (2023.01)

(56)              References Cited

U.S. PATENT DOCUMENTS

| | | | |
|---|---|---|---|
| 2017/0311322 A1 | 10/2017 | Kim et al. | |
| 2019/0141693 A1 | 5/2019 | Guo et al. | |
| 2021/0167839 A1* | 6/2021 | Zhang | ................... H04L 5/0051 |
| 2022/0311491 A1 | 9/2022 | He et al. | |
| 2023/0140213 A1* | 5/2023 | Awadin | ................. H04L 5/0044 |

FOREIGN PATENT DOCUMENTS

| | | | |
|---|---|---|---|
| CN | 110856180 | A | 2/2020 |
| CN | 110932828 | A | 3/2020 |
| CN | 113497690 | A | 10/2021 |
| WO | 2020029286 | A1 | 2/2020 |

OTHER PUBLICATIONS

Notice of Grant of Patent Right of Invention received in the corresponding Chinese Application 202010280900.1, mailed May 31, 2023.

International Search Report mailed in International Application PCT/CN2021/086261 on Jun. 30, 2021.

The first Office Action received in the corresponding Chinese Application 2020102815500 on Sep. 2, 2022.

VIVO, "Remaining Issues on Physical DL Channel Design in Unlicensed Spectrum", 3GPP TSG RAN WG1 #100bis e-Meeting, R1-2001650,Apr. 10, 2020 (Apr. 10, 2020).

Lenovo, "Summary of Email Discussion [100b-e-NR-unlic-NRU-DL_Signals_and_Channels-03] on CSI-RS", 3GPP TSG RAN, WG1#100bis-e, R1-2002788, May 1, 2020 (May 1, 2020).

Qualcomm Inc., "Email Discussion for [100e-NR-unlic-NRU-InitSignalsChannels-03]", 3GPP TSG RAN WG1 Meeting #100e, R1-2001258, Mar. 1, 2020 (Mar. 1, 2020).

LG Electronics, "Remaining issues of DL signals and channels for NR-U", 3GPP TSG RAN WG1 #100 e-Meeting, R1-2000661, Feb. 14, 2020 (Feb. 14, 2020).

Ericsson, "Remaining issues on CSI reporting", 3GPP TSG RAN WG1 Meeting #92bis, R1-1804973, Apr. 7, 2018 (Apr. 7, 2018).

InterDigital Inc., "On design of downlink signals and channels for NR-U", 3GPP TSG RAN WG1 Meeting #94bis, R1-1811202, Sep. 29, 2018 (Sep. 29, 2018).

Notice of Grant of Patent Right of Invention received in the corresponding Chinese Application 202010281550.0, mailed May 31, 2023.

The extended European search report received in the corresponding European Application 21785694.7, mailed Sep. 4, 2023.

Samsung: "DL signals and channels for NR-U", 3GPP Draft; RI-1912447, 3rd Generation Partnership Project (3GPP), Mobile Competence Centre; 650, Route Des Lucioles; F-06921 Sophia-Antipolis Cedex ; France vol. RAN WG1, No. Reno, USA; Nov. 18, 2019-Nov. 22, 2019 Nov. 8, 2019 (Nov. 8, 2019).

Nokia et al: "On DL signals and channels", 3GPP Draft; RI-1912279, 3rd Generation Partnership Project (3GPP), Mobile Competence Centre; 650, Route Des Lucioles; F-06921 Sophia-Antipolis Cedex; France vol. RAN WG1, No. Reno, Nevada, U.S.A; Nov. 18, 2019-Nov. 22, 2019 Nov. 8, 2019 (Nov. 8, 2019).

* cited by examiner

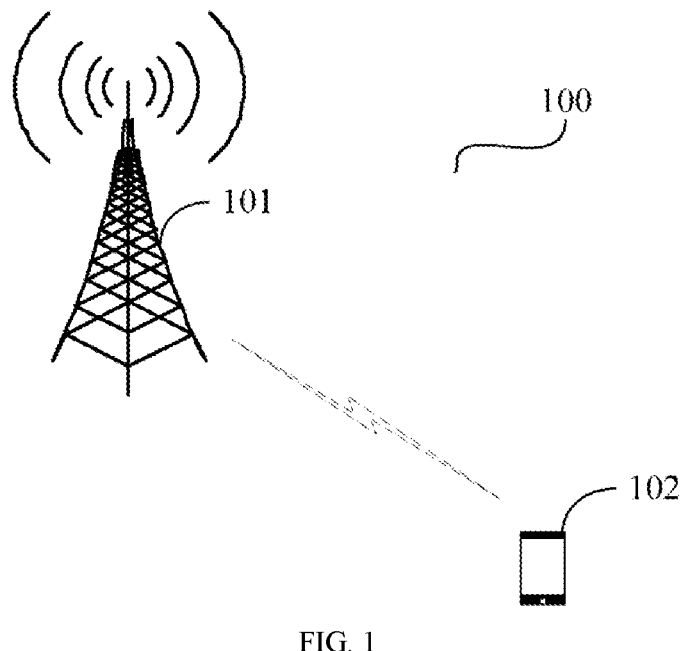
FIG. 1
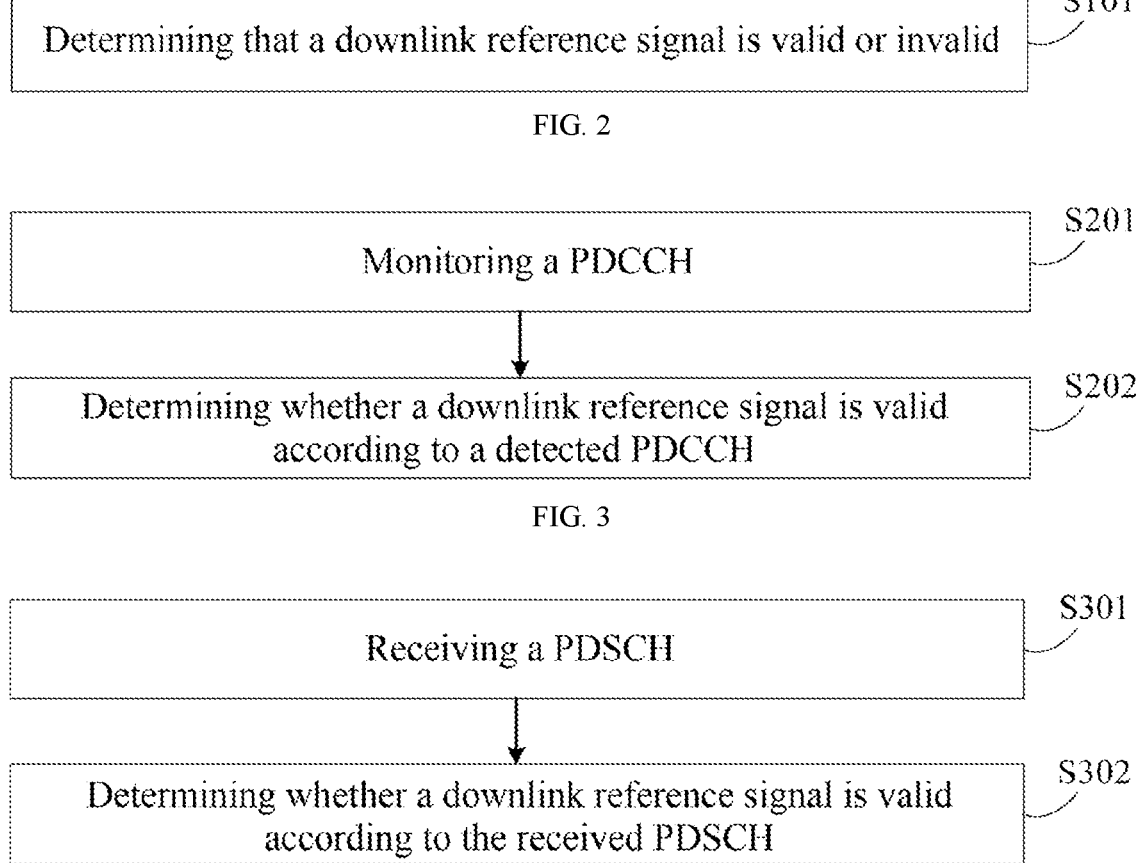
S101
Determining that a downlink reference signal is valid or invalid
FIG. 2
S201
Monitoring a PDCCH
S202
Determining whether a downlink reference signal is valid according to a detected PDCCH
FIG. 3
S301
Receiving a PDSCH
S302
Determining whether a downlink reference signal is valid according to the received PDSCH
FIG. 4

METHOD AND APPARATUS FOR PROCESSING DOWNLINK REFERENCE SIGNAL, AND READABLE STORAGE MEDIUM

CROSS-REFERENCE TO RELATED APPLICATIONS

The present application is a national stage of International Application No. PCT/CN2021/086261, which claims priority to Chinese patent application No. 2020102815500, filed on Apr. 10, 2020. Both of the aforementioned applications are hereby incorporated by reference in their entireties.

TECHNICAL FIELD

The present disclosure relates to the field of communication technology, and in particular, to a method and apparatus for processing a downlink reference signal, and a readable storage medium.

BACKGROUND

In an unlicensed spectrum, a base station can only send a downlink signal when it monitors that a channel is idle. When the base station configures a user equipment (UE) to monitor a type3-physical downlink control channel common search space (Type3-PDCCH CSS) or a DCI format 2-0, and when the UE detects the Type3-PDCCH CSS or DCI format 2-0, the UE can know information of channel occupancy time (COT) through content of downlink control information (DCI), so as to determine that a semi-statically configured channel state information-reference signal (CSI-RS) is valid within the COT. Actually, the UE also needs to determine, according to slot format indicator (SFI) information in DCI format 2-0, whether the semi-statically configured CSI-RS is "cancelled" by the SFI. For example, if the SFI indicates that a certain symbol is an uplink symbol, the CSI-RS on the symbol is cancelled. However, when the base station does not configure the UE to monitor DCI format 2-0, the UE will not know COT information, and will not be able to determine whether the semi-statically configured CSI-RS is valid. In this case, for example, the base station cannot configure DCI format 2-0 for an idle UE through broadcast signaling (generally, the base station can only configure DCI format 2-0 for the UE through dedicated RRC signaling). When the base station configures the UE to monitor DCI format 2-0, but does not send DCI format 2-0 even if there is a signal being sent, the UE cannot know information of the COT, and thus cannot determine whether the semi-statically configured CSI-RS is valid or not. In this case, for example, the base station uses a type2/2A downlink channel access procedure or listen before talk category 2 (LBT Cat 2) to send a discovery burst (where the discovery burst at least includes a synchronization signal block which may include a PDCCH for scheduling SIB1 and a PDSCH for carrying SIB1 and/or CSI-RS), but does not include DCI format 2-0.

SUMMARY

Embodiments of the present disclosure provides a method and apparatus for processing a downlink reference signal, and a readable storage medium, to determine that the downlink reference signal is valid or invalid.

In a first aspect, an embodiment of the present disclosure provides a method for processing a downlink reference signal, including:

determining that the downlink reference signal is valid or invalid.

In a second aspect, an embodiment of the present disclosure provides an apparatus for processing a downlink reference signal, including:

a processing module, configured to determine that the downlink reference signal is valid or invalid.

In a third aspect, an embodiment of the present disclosure provides an electronic device, including: a memory, a processor, and a computer program instruction;

the memory stores the computer program instruction;

the processor executes the computer program instruction to perform the method according to the first aspect or any one of the implementations thereof.

In a fourth aspect, an embodiment of the present disclosure provides a readable storage medium, including: a program;

the program is executed by a processor, so as to perform the method according to the first aspect or any one of the implementations thereof.

Embodiments of the present disclosure provides a method and apparatus for processing a downlink reference signal, and a readable storage medium, where the method includes: determining whether the downlink reference signal is valid by determining whether a UE is configured to monitor a first type PDCCH, or, by receiving a time-domain resource occupied by a downlink signal, or monitoring a time-domain resource occupied by a PDCCH or a synchronization signal block, determining whether the downlink reference signal is valid according to the time-domain resource of the received downlink signal or the monitored PDCCH or the monitored synchronization signal block, and a time-domain resource occupied by the downlink reference signal configured by a high-layer signaling.

BRIEF DESCRIPTION OF DRAWINGS

In order to more clearly describe the embodiments of the present disclosure, the following will briefly describe the drawings that need to be used in the description of the embodiments. Obviously, the drawings in the following description are some embodiments of the present disclosure. For those of ordinary skills in the art, other drawings can be obtained according to these drawings without making creative efforts.

FIG. 1 is a schematic diagram of an disclosure scenario shown by an embodiment of the present disclosure.

FIG. 2 is a flowchart of a method for processing a downlink reference signal provided by an embodiment of the present disclosure.

FIG. 3 is a flowchart of a method for processing a downlink reference signal provided by another embodiment of the present disclosure.

FIG. 4 is a flowchart of a method for processing a downlink reference signal provided by another embodiment of the present disclosure.

DESCRIPTION OF EMBODIMENTS

Figure 5:
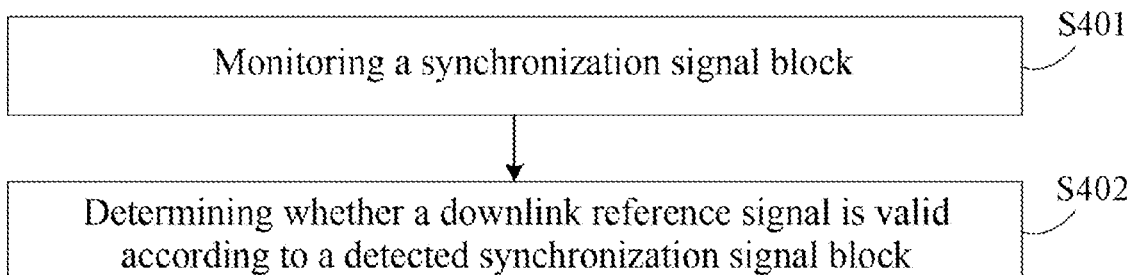
FIG. 5 is a flowchart of a method for processing a downlink reference signal provided by another embodiment of the present disclosure.

In order to make the purpose, technical solution and advantages of the embodiments of the present disclosure clearer, the technical solution in the embodiments of the present disclosure will be clearly and completely described below with reference to the drawings in the embodiments of the present disclosure. Obviously, the described embodiments are a part of the embodiments of the present disclosure, but not all embodiments. Based on the embodiments in the present disclosure, all other embodiments obtained by those of ordinary skills in the art without making creative efforts belong to the scope of protection of the present disclosure.

The terms "first", "second", "third" and "fourth" in the description and claims of the present disclosure and the above drawings, if any, are used to distinguish similar objects, and are not necessarily used to describe a specific order or sequence. It should be understood that the data used in this way can be interchanged under appropriate circumstances, so that the embodiments of the present disclosure described here can be implemented, for example, in a sequence other than those illustrated or described here. In addition, the terms "including" and "having" and any variations thereof are intended to cover non-exclusive inclusion. For example, a process, a method, a system, a product or a device that includes a series of steps or units is not necessarily limited to those steps or units that are clearly listed, but may include other steps or units that are not clearly listed or inherent to the process, method, product or device.

In unlicensed spectrum, when a base station does not configure a UE to monitor DCI format 2-0, or when the UE does not detect DCI format 2-0, it is an urgent problem to be solved that how does the UE determine whether a semi-statically configured CSI-RS is valid or not. To solve this problem, the embodiments of the present disclosure provide a method and apparatus for processing a downlink reference signal, and a readable storage medium.

The core concept of the method for processing a downlink reference signal provided by embodiments of the present disclosure is: determining whether a downlink reference signal is valid by determining whether a UE is configured to monitor a first type PDCCH, or, by receiving a time-domain resource occupied by a downlink signal, or monitoring a time-domain resource occupied by a PDCCH or a synchronization signal block, determining whether the downlink reference signal is valid according to the time-domain resource of the received downlink signal or the monitored PDCCH or the monitored synchronization signal block, and a time-domain resource occupied by the downlink reference signal configured by a high-layer signaling. Complexity of the UE is reduced, and system overhead is optimized through the above method.

In the present solution, the downlink reference signal may be for the usage of measurement, for example, a channel state information-reference signal (CSI-RS). The downlink reference signal being valid is equal to that the downlink reference signal is existing (present, presence), or useful, or needs to be measured. The UE determines that the downlink reference signal is valid in a certain period of time is equal to that the UE determines that the downlink reference signal is invalid out of the certain period of time, or that the UE does not expect that the reference signal is valid out of the certain period of time, or that the UE does not need to measure the downlink reference signal out of the certain period of time.

In the following, exemplary application scenarios of the embodiments of the present disclosure will be described.

The method for processing a downlink reference signal provided by the embodiment of the present disclosure can be performed by the apparatus for processing a downlink reference signal provided by the embodiment of the present disclosure, and the apparatus for processing a downlink reference signal provided by the embodiment of the present disclosure can be part or all of a user equipment. FIG. 1 is a schematic diagram of an exemplary application scenario of an embodiment of the present disclosure. As shown in FIG. 1, a communication system 100 includes: a network device 101 and a user equipment 102. The network device 101 and the user equipment 102 can use one or more air interface technologies for communication.

Network device 101: it may be a base station, or various types of radio access points, or may refer to a device communicating with a user equipment through one or more sectors in an air interface in an access network. The base station can be used to perform conversion between received air frames and Internet protocol (IP) packets, and act as a router between a wireless terminal and the rest of the access network, where the rest of the access network may include an IP network. The base station can also coordinate attribute management of the air interface. For example, the base station may be a base transceiver station (BTS) in a global system of mobile communication (GSM) or in code division multiple access (CDMA), or may be a base station (NodeB, NB) in wideband code division multiple access (WCDMA), or may be an evolutional base station (Evolutional Node B, eNB or eNodeB) in a long term evolution (LTE), or a relay station or an access point, or a base station gNB in a 5G network, etc., which is not limited here.

User equipment 102: it is also referred to as a terminal device, where the terminal device may be a wireless terminal or a wired terminal, the wireless terminal can be a device that provides voice and/or other business data connectivity to users, a handheld device with wireless connection functions, or other processing devices connected to a wireless modem. A wireless terminal can communicate with one or more core networks via a radio access network (RAN). The wireless terminal can be a mobile terminal, such as a mobile phone (or "cellular" phone) and a computer with a mobile terminal, for example, may be portable, pocket-sized, hand-held, computer-built or vehicle-mounted mobile apparatus, which exchanges language and/or data with the radio access network. For example, a personal communication service (PCS) telephone, a cordless telephone, a session initiation protocol (SIP) telephone, a wireless local loop (WLL) station, a personal digital assistant (PDA) or other devices. The wireless terminal can also be referred to as a system, a subscriber unit, a subscriber station, a mobile station, a mobile, a remote station, a remote terminal, an access terminal, a user terminal or a user agent, which is not limited here.

It should be noted that the above mentioned communication system 100 may be a long term evolution (LTE) communication system, a 5G communication system, or other communication systems in the future, which is not limited here.

It should be noted that in the following embodiments, an example is taken for detailed description where the downlink reference signal is a CSI-RS.

FIG. 2 is a flowchart of a method for processing a downlink reference signal provided by an embodiment of the present disclosure. The method can be performed by an apparatus for processing a downlink reference signal provided by an embodiment of the present disclosure, and the apparatus can be implemented in forms of software and/or hardware, for example: the apparatus can be part of or all of the above mentioned user equipment, and the user equipment is taken as an example of the executive subject for description of the method for processing a downlink reference signal. As shown in FIG. 2, the method in the embodiment of the present disclosure includes:

S101, determining that the downlink reference signal is valid or invalid.

In a possible implementation, a UE can determine whether the downlink reference signal is valid by determining whether the UE is configured to monitor a first type PDCCH.

In an embodiment, the first type PDCCH is a type3-PDCCH scrambled by a slot format indication-radio network temporary identity. The first type PDCCH usually adopts DCI format 2-0. The first type PDCCH may also be referred to as a PDCCH scrambled by an SFI-RNTI carrying DCI format 2-0.

Specifically, if the UE is not configured to monitor the first type PDCCH, the downlink reference signal is determined to be invalid; if the UE is configured to monitor the first type PDCCH, but the UE does not detect the PDCCH, the downlink reference signal is determined to be invalid. That is, under the circumstance that the UE is not configured to monitor DCI format 2-0, the CSI-RS is determined to be invalid; under the circumstance that the UE is configured to monitor DCI format 2-0, but the UE does not detect DCI format 2-0, the CSI-RS is determined to be invalid.

According to the above mentioned method, it can be implemented that the UE determines whether the downlink reference signal is valid, and complexity of the UE can be reduced, and system overhead is optimized.

In another possible implementation, the UE can receive a PDSCH or monitor a PDCCH or monitor a synchronization signal block, and determine whether the downlink reference signal is valid according to a time-domain resource occupied by the received PDSCH, or detected PDCCH, or detected synchronization signal block, and a time-domain resource occupied by the downlink reference signal.

According to the above mentioned method, it can be implemented that the UE determines whether the downlink reference signal is valid, and can reduce complexity of the UE, and optimize system overhead.

In the following, specific implementations of the above determination of whether the downlink reference signal is valid by receiving a PDSCH, or monitoring a PDCCH, or monitoring a synchronization signal block will be described in detail with reference to several specific embodiments.

Embodiment 2

FIG. 3 is a flowchart of a method for processing a downlink reference signal provided by another embodiment of the present disclosure. In the present embodiment, a UE monitors a PDCCH, and determines whether a downlink reference signal CSI-RS is valid according to a detected PDCCH. As shown in FIG. 3, the method of the present embodiment includes:

S201, monitoring a PDCCH;

S202, determining whether a downlink reference signal is valid according to a detected PDCCH.

Under some circumstances, even if the UE is not configured to monitor DCI format 2-0, or the UE is configured to monitor DCI format 2-0, but does not detect DCI format 2-0, the UE can still determine whether the CSI-RS is valid. According to the definition of the downlink transmission burst, when a group of downlink transmission bursts from a base station does not have a time gap greater than 16 microseconds, then this group of downlink transmission is a downlink transmission burst. When it is assumed that a base station in a downlink transmission burst occupies a channel, the UE can determine whether the CSI-RS is valid according to the downlink transmission burst. The CSI-RS may be a periodic or semi-persistent CSI-RS. The periodic or semi-persistent CSI-RS may be pre-configured, for example, semi-statically configured, or semi-statically configured and dynamically activated.

Generally, the UE needs to monitor the PDCCH, and then the UE can determine whether the CSI-RS is valid according to whether the detected PDCCH and the CSI-RS belong to the same downlink transmission burst.

In a possible implementation, if a time gap between a last OFDM symbol in a time-domain resource occupied by the detected PDCCH and a first OFDM symbol in a time-domain resource occupied by the CSI-RS is smaller than or equal to a preset time gap, it is determined that the PDCCH detected by the UE and the CSI-RS belong to the same downlink transmission burst, that is, the CSI-RS is valid. If the time gap between the last OFDM symbol in the time-domain resource occupied by the detected PDCCH and the first OFDM symbol in the time-domain resource occupied by the CSI-RS is greater than the preset time gap, it is determined that the PDCCH detected by the UE and the CSI-RS does not belong to the same downlink transmission burst, that is, the CSI-RS is invalid. The preset time gap is determined according to the downlink transmission burst.

In an embodiment, the preset time gap is 16 microseconds.

In another possible implementation, if a time-domain resource occupied by the detected PDCCH is continuous with a time-domain resource occupied by the CSI-RS, it is determined that the CSI-RS is valid; if the time-domain resource occupied by the detected PDCCH is not continuous with the time-domain resource occupied by the CSI-RS, it is determined that the CSI-RS is invalid.

In an orthogonal frequency division modulation (OFDM) system, a time gap between continuous symbols can be considered as 0, hence the above manner can also be understood as: if the UE detects a PDCCH, the UE can determine that the CSI-RS and the PDCCH (or a CORESET corresponding to the PDCCH) belong to the same downlink transmission burst, or that the CSI-RS is valid, where the CSI-RS and the PDCCH (or the CORESET corresponding to the PDCCH) are continuous in symbol. Symbols being continuous can also be understood as time-domain resources or time-domain symbols being continuous.

In another possible implementation, if a time gap between a last OFDM symbol in a time-domain resource occupied by the detected PDCCH and a first OFDM symbol in a time-domain resource occupied by the CSI-RS is smaller than a preset threshold, it is determined that the CSI-RS is valid; if the time gap between the last OFDM symbol in the time-domain resource occupied by the detected PDCCH and the first OFDM symbol in the time-domain resource occupied by the CSI-RS is greater than or equal to the preset threshold, it is determined that the CSI-RS is invalid.

In another possible implementation, if a time gap between a first OFDM symbol in a time-domain resource occupied by the detected PDCCH and a last OFDM symbol in a time-domain resource occupied by the CSI-RS is smaller than a preset threshold, it is determined that the CSI-RS is valid; if the time gap between the first OFDM symbol in the time-domain resource occupied by the detected PDCCH and the last OFDM symbol in the time-domain resource occupied by the CSI-RS is greater than or equal to the preset threshold, it is determined that the CSI-RS is invalid.

In another possible implementation, if a time gap between a last OFDM symbol in a time-domain resource occupied by the detected PDCCH and a last OFDM symbol in a time-domain resource occupied by the CSI-RS is smaller than a preset threshold, it is determined that the CSI-RS is valid; if the time gap between the last OFDM symbol in the time-domain resource occupied by the detected PDCCH and the last OFDM symbol in the time-domain resource occupied by the CSI-RS is greater than or equal to the preset threshold, it is determined that the CSI-RS is invalid.

In another possible implementation, if a time gap between a first OFDM symbol in a time-domain resource occupied by the detected PDCCH and a first OFDM symbol in a time-domain resource occupied by the CSI-RS is smaller than a preset threshold, it is determined that the CSI-RS is valid; if the time gap between the first OFDM symbol in the time-domain resource occupied by the detected PDCCH and the first OFDM symbol in the time-domain resource occupied by the CSI-RS is greater than or equal to the preset threshold, it is determined that the CSI-RS is invalid.

That is, there may be a time gap of X symbols between the PDCCH and CSI-RS, the base station can send a reserved signal or other signals/channels to occupy the channel. Hence, if the UE detects a PDCCH, the UE can determine that the CSI-RS and the PDCCH (or the CORESET corresponding to the PDCCH) belong to the same downlink transmission burst, or that the CSI-RS is valid, where the time gap between the CSI-RS and (end of) the PDCCH (or the CORESET corresponding to the PDCCH) is smaller than X symbols, and X is a positive integer.

The time-domain resource occupied by the detected PDCCH here can be understood as a control resource set (CORESET) to which the detected PDCCH belongs, or a time-domain resource of the control resource set to which the detected PDCCH belongs.

In another possible implementation, if a time-domain resource occupied by the detected PDCCH and a time-domain resource occupied by the CSI-RS have a time-domain resource that is at least partially same, it is determined that the CSI-RS is valid; if the time-domain resource occupied by the detected PDCCH and the time-domain resource occupied by the CSI-RS do not have the same time-domain resource, it is determined that the CSI-RS is invalid.

That is, one CSI-RS may use one symbol in the PDCCH (or the CORESET corresponding to the PDCCH), that is, the CSI-RS and the PDCCH (or the CORESET corresponding to the PDCCH) are frequency division multiplexed (FDM), at this time, the CSI-RS and the PDCCH (or the CORESET corresponding to the PDCCH) also belong to one downlink transmission burst. Hence, if the UE detects a PDCCH, the UE can determine that the CSI-RS and the PDCCH (or the CORESET corresponding to the PDCCH) belong to the same downlink transmission burst, or that the CSI-RS is valid, where the CSI-RS and the PDCCH (or the CORESET corresponding to the PDCCH) at least have one same symbol.

In any of the above implementations, the PDCCH may belong to a type0-physical downlink control channel common search space (Type0-PDCCH CSS), which is mainly used to schedule a physical downlink share channel (PDSCH) of a system information block 1 (SIB1); or, may belong to a type1-physical downlink control channel common search space (Type1-PDCCH CSS), which is mainly used to schedule a PDSCH of a random access response (RAR); or, may be a type2-physical downlink control channel common search space (Type2-PDCCH CSS), which is mainly used to schedule a PDSCH of a paging message; or, may belong to a UE specific search space (USS), which is mainly used to schedule a unicast PDSCH. The present disclosure does not limit the type of the PDCCH.

Under some other circumstances, it can be considered that the detected PDCCH and the CSI-RS are in the same slot, and then the CSI-RS and the detected PDCCH belong to one downlink transmission burst.

In another possible implementation, if a time-domain resource occupied by the detected PDCCH and a time-domain resource occupied by the CSI-RS are in the same slot, it is determined that the CSI-RS is valid; if the time-domain resource occupied by the detected PDCCH and the time-domain resource occupied by the CSI-RS are not in the same slot, it is determined that the CSI-RS is invalid.

That is, if the PDCCH detected by the UE and the CSI-RS belong to the same slot, the UE can determine that the detected PDCCH and the CSI-RS belong to the same downlink transmission burst, and further determine that the CSI-RS is valid.

In another possible implementation, if a time-domain resource occupied by the detected PDCCH and a time-domain resource occupied by the CSI-RS are in a first half slot or a second half slot of the same slot, it is determined that the CSI-RS is valid; if the time-domain resource occupied by the detected PDCCH and the time-domain resource occupied by the CSI-RS are not in the first half slot or the second half slot of the same slot, it is determined that the CSI-RS is invalid.

For the unlicensed spectrum in a high frequency band, the downlink transmission burst may be less than one slot, such as a half slot (from symbol 0 to symbol 6, or from symbol 7 to symbol 13). Hence, the UE can determine whether the CSI-RS is valid according to whether the detected PDCCH and the CSI-RS are in the same half slot, where the half slot may be the first half slot or the second half slot. Specifically, if the PDCCH detected by the UE and the CSI-RS are in the same half slot, it is determined that the CSI-RS is valid; if the PDCCH detected by the US and the CSI-RS are not in the same half slot, it is determined that the CSI-RS is invalid.

Under some other circumstances, it can be considered that if the CSI-RS and the detected PDCCH are in a plurality of slots or a plurality of half slots, the CSI-RS and the PDCCH belong to one downlink transmission burst. Correspondingly, the UE can determine whether the CSI-RS is valid. If a time-domain resource occupied by the detected PDCCH and a time-domain resource occupied by the CSI-RS are in the same plurality of slots or the same plurality of half slots, it is determined that the CSI-RS is valid; if the time-domain resource occupied by the detected PDCCH and the time-domain resource occupied by the CSI-RS are not in the same plurality of slots or the same plurality of half slots, it is determined that the CSI-RS is invalid. In such way, a total COT duration can be increased when a duration of a slot is relatively short.

The above mentioned determining method may also include: the UE determining whether the CSI-RS is valid in a frequency domain. In the above determining method, only when the resource of the CSI-RS is limited in a resource block set (RB-set), the UE determines that the CSI-RS is valid, otherwise the UE determines that the CSI-RS is invalid, where the resource block set of the CSI-RS overlaps with the control resource set to which the PDCCH belongs.

In the present embodiment, the UE detects the PDCCH, and determines whether the downlink reference signal is valid according to a relationship between the time-domain resource occupied by the detected PDCCH and the time-domain resource occupied by the downlink reference signal configured by a high-layer signaling. Through the method of the present embodiment, complexity of the system can be reduced.

Embodiment 3

FIG. 4 is a flowchart of a method for processing a downlink reference signal provided by another embodiment of the present disclosure. In the present embodiment, a UE receives the PDSCH, and determines whether the downlink reference signal CSI-RS is valid according to a received PDSCH. As shown in FIG. 4, the method of the present embodiment includes:

S301, receiving a PDSCH;

S302, determining whether a downlink reference signal is valid according to the received PDSCH.

Under some circumstances, a UE may be scheduled to receive the PDSCH, and the UE can determine whether the PDSCH and the CSI-RS belong to the same downlink transmission burst according to a time-domain resource occupied by the received PDSCH, that is, determine whether the CSI-RS is valid.

In a possible implementation, if a time gap between a last OFDM symbol in a time-domain resource occupied by the received PDSCH and a first OFDM symbol in a time-domain resource occupied by the CSI-RS is smaller than or equal to a preset time gap, it is determined that the CSI-RS is valid; if the time gap between the last OFDM symbol in the time-domain resource occupied by the received PDSCH and the first OFDM symbol in the time-domain resource occupied by the CSI-RS is greater than the preset time gap, it is determined that the CSI-RS is invalid; where the preset time gap is determined according to a downlink transmission burst.

In an embodiment, the preset time gap is 16 microseconds.

That is, if the UE (is scheduled to) receive(s) one PDSCH, the UE can determine that the CSI-RS and the PDSCH belong to the same downlink transmission burst or that the CSI-RS is valid, where the time gap between the CSI-RS and the (end of) PDSCH is no greater than 16 microseconds.

In a possible implementation, if a time-domain resource occupied by the received PDSCH is continuous with a time-domain resource occupied by the CSI-RS, it is determined that the CSI-RS is valid; if the time-domain resource occupied by the PDSCH is not continuous with the time-domain resource occupied by the CSI-RS, it is determined that the CSI-RS is invalid.

That is, if the UE (is scheduled to) receive(s) one PDSCH, the UE can determine that the CSI-RS and the PDSCH belong to the same downlink transmission burst or that the CSI-RS is valid, where symbols of the CSI-RS are continuous with symbols of the PDSCH.

In another possible implementation, if a time gap between a last OFDM symbol in a time-domain resource occupied by the received PDSCH and a first OFDM symbol in a time-domain resource occupied by the CSI-RS is smaller than a preset threshold, it is determined that the CSI-RS is valid; if the time gap between the last OFDM symbol in the time-domain resource occupied by the received PDSCH and the first OFDM symbol in the time-domain resource occupied by the CSI-RS is greater than or equal to the preset threshold, it is determined that the CSI-RS is invalid.

In another possible implementation, if a time gap between a first OFDM symbol in a time-domain resource occupied by the received PDSCH and a last OFDM symbol in a time-domain resource occupied by the CSI-RS is smaller than a preset threshold, it is determined that the CSI-RS is valid; if the time gap between the first OFDM symbol in the time-domain resource occupied by the received PDSCH and the last OFDM symbol in the time-domain resource occupied by the CSI-RS is greater than or equal to the preset threshold, it is determined that the CSI-RS is invalid.

In another possible implementation, if a time gap between a last OFDM symbol in a time-domain resource occupied by the received PDSCH and a last OFDM symbol in a time-domain resource occupied by the CSI-RS is smaller than a preset threshold, it is determined that the CSI-RS is valid; if the time gap between the last OFDM symbol in the time-domain resource occupied by the received PDSCH and the last OFDM symbol in the time-domain resource occupied by the CSI-RS is greater than or equal to the preset threshold, it is determined that the CSI-RS is invalid.

In another possible implementation, if a time gap between a first OFDM symbol in a time-domain resource occupied by the received PDSCH and a first OFDM symbol in a time-domain resource occupied by the CSI-RS is smaller than a preset threshold, it is determined that the CSI-RS is valid; if the time gap between the first OFDM symbol in the time-domain resource occupied by the received PDSCH and the first OFDM symbol in the time-domain resource occupied by the CSI-RS is greater than or equal to the preset threshold, it is determined that the CSI-RS is invalid.

That is, if the UE (is scheduled to) receive(s) one PDSCH, the UE can determine that the CSI-RS and the PDSCH belong to the same downlink transmission burst or that the CSI-RS is valid, where the time gap between the CSI-RS and the (end of) PDSCH is smaller than X symbols, and X is a positive integer.

In another possible implementation, if a time-domain resource occupied by the received PDSCH and a time-domain resource occupied by the CSI-RS have a time-domain resource that is at least partially same, it is determined that the CSI-RS is valid; if the time-domain resource occupied by the received PDSCH and the time-domain resource occupied by the CSI-RS do not have the same time-domain resource, it is determined that the CSI-RS is invalid.

That is, if the UE (is scheduled to) receive(s) one PDSCH, the UE can determine that the CSI-RS and the PDSCH belong to the same downlink transmission burst or that the CSI-RS is valid, where the CSI-RS and the PDSCH at least have one same symbol.

That is, if the UE (is scheduled to) receive(s) one PDSCH, the UE can determine that the CSI-RS and the PDSCH belong to the same downlink transmission burst or that the CSI-RS is valid, where the PDSCH overlaps with the CSI-RS.

In any one of the above possible implementations, the PDSCH may be a PDSCH of a SIB1; or may be a PDSCH of an RAR; or may be a PDSCH of a paging message; or may be a unicast PDSCH scheduled. The type of the PDSCH is not limited here.

Under some other circumstances, it can be considered that the received PDSCH and the CSI-RS are in the same slot, and the CSI-RS and the received PDSCH belong to one downlink transmission burst.

In another possible implementation, if a time-domain resource occupied by the received PDSCH and a time-domain resource occupied by the CSI-RS are in the same slot, it is determined that the CSI-RS is valid; if the time-domain resource occupied by the received PDSCH and the time-domain resource occupied by the CSI-RS are not in the same slot, it is determined that the CSI-RS is invalid.

That is, if the CSI-RS and the PDSCH received by the UE belong to the same slot, the UE can determine that the received PDSCH and the CSI-RS belong to the same downlink transmission burst, and further determine that the CSI-RS is valid.

In another possible implementation, if a time-domain resource occupied by the received PDSCH and a time-domain resource occupied by the CSI-RS are in a first half slot or a second half slot of the same slot, it is determined that the CSI-RS is valid; if the time-domain resource occupied by the received PDSCH and the time-domain resource occupied by the CSI-RS are not in the first half slot or the second half slot of the same slot, it is determined that the CSI-RS is invalid.

For the unlicensed spectrum in a high frequency band, the downlink transmission burst may be less than one slot, such as a half slot (from symbol 0 to symbol 6, or from symbol 7 to symbol 13). Hence, the UE can determine whether the CSI-RS is valid according to whether the received PDSCH and the CSI-RS are in the same half slot, where the half slot may be the first half slot or the second half slot.

Specifically, if the PDSCH received by the UE and the CSI-RS are in the same half slot, the UE can determine that the CSI-RS and the received PDSCH belong to the same downlink transmission burst, and determine that the CSI-RS is valid; if the PDSCH received by the UE and the CSI-RS are not in the same half slot, the UE can determine that the CSI-RS and the received PDSCH belong to the same downlink transmission burst, and determine that the CSI-RS is invalid.

Under some other circumstances, it can be considered that if the CSI-RS and the received PDSCH are in a plurality of slots or a plurality of half slots, the CSI-RS and the PDSCH belong to one downlink transmission burst. Correspondingly, the UE can determine whether the CSI-RS is valid. If a time-domain resource occupied by the received PDSCH and a time-domain resource occupied by the CSI-RS are in the same plurality of slots or the same plurality of half slots, it is determined that the CSI-RS is valid; if the time-domain resource occupied by the received PDSCH and the time-domain resource occupied by the CSI-RS are not in the same plurality of slots or the same plurality of half slots, it is determined that the CSI-RS is invalid. In such way, a total COT duration can be increased when a duration of a slot is relatively short.

The above mentioned determining method may also include: UE determining whether the CSI-RS is valid in a frequency domain. In the above determining method, only when the resource of the CSI-RS is limited in a resource block set (RB-set), the UE determines that the CSI-RS is valid, otherwise the UE determines that the CSI-RS is invalid, where the resource block set overlaps with the received PDSCH.

In the present embodiment, the UE receives the PDSCH, and determines whether the downlink reference signal is valid according to a relationship between the time-domain resource occupied by the received PDSCH and the time-domain resource occupied by the downlink reference signal configured by a high-layer signaling. Through the method of the present embodiment, complexity of the UE can be reduced, and overhead of the system can be optimized.

Embodiment 4

FIG. 5 is a flowchart of a method for processing a downlink reference signal provided by another embodiment of the present disclosure. In the present embodiment, a UE monitors a synchronization signal block, and determines whether a downlink reference signal CSI-RS is valid according to a detected synchronization signal block. As shown in FIG. 5, the method of the present embodiment includes:

S401, monitoring a synchronization signal block;

S402, determining whether a downlink reference signal is valid according to a detected synchronization signal block.

Under some circumstances, the UE needs to monitor the synchronization signal block, hence the UE can determine one downlink transmission burst according to the detected synchronization signal block, and determine whether the CSI-RS is valid.

In a possible implementation, if a time gap between a last OFDM symbol in a time-domain resource occupied by the detected synchronization signal block and a first OFDM symbol in a time-domain resource occupied by the CSI-RS is smaller than or equal to a preset time gap, it is determined that the CSI-RS is valid; if the time gap between the last OFDM symbol in the time-domain resource occupied by the detected synchronization signal block and the first OFDM symbol in the time-domain resource occupied by the CSI-RS is greater than the preset time gap, it is determined that the CSI-RS is invalid; where the preset time gap is determined according to a downlink transmission burst.

In an embodiment, the preset time gap is 16 microseconds.

That is, if the UE detects one synchronization signal block, the UE can determine that the CSI-RS and the synchronization signal block belong to the same downlink transmission burst, or that the CSI-RS is valid, where the time gap between the CSI-RS and the (end of) synchronization signal block is no greater than 16 microseconds.

In another possible implementation, if a time-domain resource occupied by the detected synchronization signal block is continuous with a time-domain resource occupied by the CSI-RS, it is determined that the CSI-RS is valid; if the time-domain resource occupied by the detected synchronization signal block is not continuous with the time-domain resource occupied by the CSI-RS, it is determined that the CSI-RS is invalid.

In an orthogonal frequency division modulation (OFDM) system, a time gap between continuous symbols can be considered as 0, hence the above manner can also be understood as: if the UE detects a synchronization signal block, the UE can determine that the CSI-RS and the synchronization signal block belong to the same downlink transmission burst, or that the CSI-RS is valid, where CSI-RS and the synchronization signal block are continuous in symbol. Symbols being continuous can also be understood as time-domain resources or time-domain symbols being continuous.

In another possible implementation, if a time gap between a last OFDM symbol in a time-domain resource occupied by the detected synchronization signal block and a first OFDM symbol in a time-domain resource occupied by the CSI-RS is smaller than a preset threshold, it is determined that the CSI-RS is valid; if the time gap between the last OFDM symbol in the time-domain resource occupied by the detected synchronization signal block and the first OFDM symbol in the time-domain resource occupied by the CSI-RS is greater than or equal to the preset threshold, it is determined that the CSI-RS is invalid.

In another possible implementation, if a time gap between a first OFDM symbol in a time-domain resource occupied by the detected synchronization signal block and a last OFDM symbol in a time-domain resource occupied by the CSI-RS is smaller than a preset threshold, it is determined that the CSI-RS is valid; if the time gap between the first OFDM symbol in the time-domain resource occupied by the detected synchronization signal block and the last OFDM symbol in the time-domain resource occupied by the CSI-RS is greater than or equal to the preset threshold, it is determined that the CSI-RS is invalid.

In another possible implementation, if a time gap between a last OFDM symbol in a time-domain resource occupied by the detected synchronization signal block and a last OFDM symbol in a time-domain resource occupied by the CSI-RS is smaller than a preset threshold, it is determined that the CSI-RS is valid; if the time gap between the last OFDM symbol in the time-domain resource occupied by the detected synchronization signal block and the last OFDM symbol in the time-domain resource occupied by the CSI-RS is greater than or equal to the preset threshold, it is determined that the CSI-RS is invalid.

In another possible implementation, if a time gap between a first OFDM symbol in a time-domain resource occupied by the detected synchronization signal block and a first OFDM symbol in a time-domain resource occupied by the CSI-RS is smaller than a preset threshold, it is determined that the CSI-RS is valid; if the time gap between the first OFDM symbol in the time-domain resource occupied by the detected synchronization signal block and the first OFDM symbol in the time-domain resource occupied by the CSI-RS is greater than or equal to the preset threshold, it is determined that the CSI-RS is invalid.

That is, there may be a time gap of X symbols between the synchronization signal block and CSI-RS, the base station can send a reserved signal or other signals/channels to occupy the channel. Hence, if the UE detects one synchronization signal block, the UE can determine that the CSI-RS and the synchronization signal block belong to the same downlink transmission burst, or that the CSI-RS is valid, where the time gap between the CSI-RS and the (end of) synchronization signal block is smaller than X symbols, and X is a positive integer.

In another possible implementation, if a time-domain resource occupied by the detected synchronization signal block and a time-domain resource occupied by the CSI-RS have a time-domain resource that is at least partially same, it is determined that the CSI-RS is valid; if the time-domain resource occupied by the detected synchronization signal block and the time-domain resource occupied by the CSI-RS do not have the same time-domain resource, it is determined that the CSI-RS is invalid.

One CSI-RS can use one symbol in the synchronization signal block (generally 4 symbols), that is, the CSI-RS and the synchronization signal block are frequency division multiplexed (FDM), and at this time, the CSI-RS and the synchronization signal block also belong to one downlink transmission burst. Hence, if the UE detects one synchronization signal block, the UE can determine that the CSI-RS and the synchronization signal block belong to the same downlink transmission burst, or that the CSI-RS is valid, where the CSI-RS and the synchronization signal block at least have one same symbol.

In another possible implementation, if a time-domain resource occupied by the detected synchronization signal block and a time-domain resource occupied by the CSI-RS are in the same slot, it is determined that the CSI-RS is valid; if the time-domain resource occupied by the detected synchronization signal block and the time-domain resource occupied by the CSI-RS are not in the same slot, it is determined that the CSI-RS is invalid.

Under some circumstances, when a variable M in an indexical relationship of a monitoring occasion of a Type0-PDCCH and a candidate synchronization signal block is equal to 1 or 2, or a variable O is equal to 2 or 5 or 7, the synchronization signal block may not be in the same slot as the Type0-PDCCH, and at this time, the base station can send the CSI-RS in the slot of the synchronization signal block. In such way, if the UE detects one synchronization signal block, the UE can determine that the CSI-RS and the synchronization signal block belong to the same downlink transmission burst, or that the CSI-RS is valid, where the CSI-RS and the synchronization signal block belong to the same slot.

In another possible implementation, if a time-domain resource occupied by the detected synchronization signal block and a time-domain resource occupied by the CSI-RS are in a first half slot or a second half slot of the same slot, it is determined that the CSI-RS is valid; if the time-domain resource occupied by the detected synchronization signal block and the time-domain resource occupied by the CSI-RS are not in the first half slot and the second half slot of the same slot, it is determined that the CSI-RS is invalid.

That is, if the UE detects one synchronization signal block, the UE can determine that the CSI-RS and the synchronization signal block belong to the same downlink transmission burst, or that the CSI-RS is valid, where the CSI-RS and the synchronization signal block belong to the same half slot, and the half slot may be, for example, the first half slot or the second half slot.

In any one of the above possible implementations, since the synchronization signal block is sent only in a discovery burst transmission window, the above-mentioned manner can be limited in the burst transmission window.

Under some other circumstances, it can be considered that if the CSI-RS and the detected synchronization signal block are in a plurality of slots or a plurality of half slots, the CSI-RS and the synchronization signal block belong to one downlink transmission burst. Correspondingly, the UE can determine whether the CSI-RS is valid. If a time-domain resource occupied by the detected synchronization signal block and a time-domain resource occupied by the CSI-RS are in the same plurality of slots or the same plurality of half slots, it is determined that the CSI-RS is valid; if the time-domain resource occupied by the detected synchronization signal block and the time-domain resource occupied by the CSI-RS are not in the same plurality of slots or the same plurality of half slots, it is determined that the CSI-RS is invalid. In such way, a total COT duration can be increased when a duration of a slot is relatively short.

The above mentioned determining method may also include: UE determining whether the CSI-RS is valid in a frequency domain. In the above determining method, only when the resource of the CSI-RS is limited in a resource block set (RB-set), the UE determines that the CSI-RS is valid, otherwise the UE determines that the CSI-RS is invalid, where the resource block set overlaps with the detected synchronization signal block.

In the above methods, it can be further defined that the UE only determines that the CSI-RS having a quasi colocation (QCL) relationship with the synchronization signal block is valid. The QCL relationship may be a typeA quasi colocation (TypeA QCL) relationship, or a typeB quasi colocation (TypeB QCL) relationship, or a typeC quasi colocation (TypeC QCL) relationship, or a typeD quasi colocation (TypeD QCL) relationship, or an equivalent average receive power, etc. In such way, the UE can only determine whether the CSI-RS having a beam direction relationship with the detected synchronization signal block is valid, and complexity of the UE is reduced.

In the present embodiment, the UE monitors the synchronization signal block, and determines whether the downlink reference signal is valid according to a relationship between a time-domain resource occupied by the detected synchronization signal block and a time-domain resource occupied by the downlink reference signal configured by a high-layer signaling. Through the method of the present embodiment, complexity of the UE can be reduced, and overhead of the system is optimized.

In practical application, the methods of the above embodiments can be used alone or in combination, and the embodiments of the present disclosure are not limited thereto.

Figure 6:
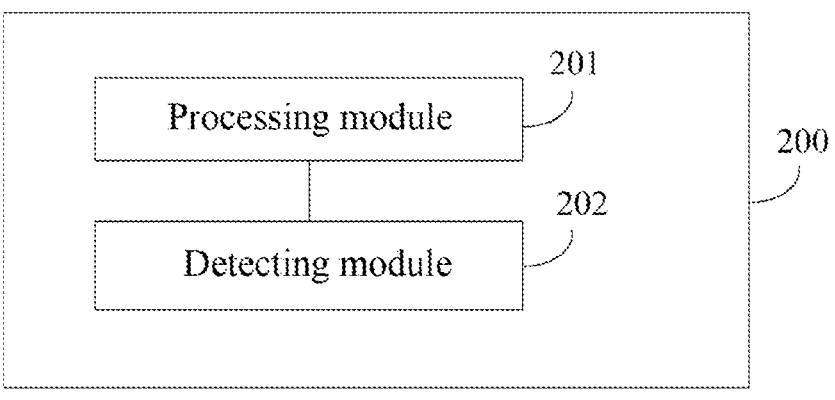
FIG. 6 is a schematic structural diagram of an apparatus for processing a downlink reference signal provided by an embodiment of the present disclosure.

FIG. 6 is a schematic structural diagram of an apparatus for processing a downlink reference signal provided by an embodiment of the present disclosure. As shown in FIG. 6, the apparatus for processing a downlink reference signal 200 includes: a processing module 201.

The processing module 201 is configured to determine that the downlink reference signal is valid or invalid.

In some possible designs, the processing module 201 is specifically configured to: if not being configured to monitor a first type physical downlink control channel PDCCH, determine that the downlink reference signal is invalid; or, if being configured to monitor the first type PDCCH, and the first type PDCCH is not detected, determine that the downlink reference signal is invalid.

In some possible designs, the first type PDCCH is a type3-PDCCH scrambled by SFI-RNTI.

In some possible designs, the processing module 201 is specifically configured to: if a time gap between a last OFDM symbol in a time-domain resource occupied by a detected PDCCH and a first OFDM symbol in a time-domain resource occupied by the downlink reference signal is smaller than or equal to a preset time gap, determine that the downlink reference signal is valid; and if the time gap between the last OFDM symbol in the time-domain resource occupied by the detected PDCCH and the first OFDM symbol in the time-domain resource occupied by the downlink reference signal is greater than the preset time gap, determine that the downlink reference signal is invalid;

where the preset time gap is determined according to a downlink transmission burst.

In some possible designs, the processing module 201 is specifically configured to: if a time-domain resource occupied by a detected PDCCH is continuous with a time-domain resource occupied by the downlink reference signal, determine that the downlink reference signal is valid; and if the time-domain resource occupied by the detected PDCCH is not continuous with the time-domain resource occupied by the downlink reference signal, determine that the downlink reference signal is invalid.

In some possible designs, the processing module 201 is specifically configured to: if a time gap between a last OFDM symbol in a time-domain resource occupied by a detected PDCCH and a first OFDM symbol in a time-domain resource occupied by the downlink reference signal is smaller than a preset threshold, determine that the downlink reference signal is valid; and if the time gap between the last OFDM symbol in the time-domain resource occupied by the detected PDCCH and the first OFDM symbol in the time-domain resource occupied by the downlink reference signal is greater than or equal to the preset threshold, determine that the downlink reference signal is invalid.

In some possible designs, the processing module 201 is specifically configured to: if a time-domain resource occupied by a detected PDCCH and a time-domain resource occupied by the downlink reference signal have a time-domain resource that is at least partially same, determine that the downlink reference signal is valid; and if the time-domain resource occupied by the detected PDCCH and the time-domain resource occupied by the downlink reference signal do not have a same time-domain resource, determine that the downlink reference signal is invalid.

In some possible designs, the processing module 201 is specifically configured to: if a time-domain resource occupied by a detected PDCCH and a time-domain resource occupied by the downlink reference signal are in a same slot, determine that the downlink reference signal is valid; and if the time-domain resource occupied by the detected PDCCH and the time-domain resource occupied by the downlink reference signal are not in the same slot, determine that the downlink reference signal is invalid.

In some possible designs, the processing module 201 is specifically configured to: if a time-domain resource occupied by a detected PDCCH and a time-domain resource occupied by the downlink reference signal are in a first half slot or a second half slot of a same slot, determine that the downlink reference signal is valid; and if the time-domain resource occupied by the detected PDCCH and the time-domain resource occupied by the downlink reference signal are not in the first half slot or the second half slot of the same slot, determine that the downlink reference signal is invalid.

In some possible designs, the processing module 201 is specifically configured to: if a time gap between a last OFDM symbol in a time-domain resource occupied by a received PDSCH and a first OFDM symbol in a time-domain resource occupied by the downlink reference signal is smaller than or equal to a preset time gap, determine that the downlink reference signal is valid; and if the time gap between the last OFDM symbol in the time-domain resource occupied by the received PDSCH and the first OFDM symbol in the time-domain resource occupied by the downlink reference signal is greater than the preset time gap, determine that the downlink reference signal is invalid;

where the preset time gap is determined according to a downlink transmission burst.

In some possible designs, the processing module 201 is specifically configured to: if a time-domain resource occupied by a received PDSCH is continuous with a time-domain resource occupied by the downlink reference signal, determine that the downlink reference signal is valid; and, if the time-domain resource occupied by the received PDSCH is not continuous with the time-domain resource occupied by the downlink reference signal, determine that the downlink reference signal is invalid.

In some possible designs, the processing module 201 is specifically configured to: if a time gap between a last OFDM symbol in a time-domain resource occupied by a received PDSCH and a first OFDM symbol in a time-domain resource occupied by the downlink reference signal is smaller than a preset threshold, determine that the downlink reference signal is valid; and if the time gap between the last OFDM symbol in the time-domain resource occupied by the received PDSCH and the first OFDM symbol in the time-domain resource occupied by the downlink reference signal is greater than or equal to the preset threshold, determine that the downlink reference signal is invalid.

In some possible designs, the processing module 201 is specifically configured to: if a time-domain resource occupied by a received PDSCH and a time-domain resource occupied by the downlink reference signal have a time-domain resource that is at least partially same, determine that the downlink reference signal is valid; and if the time-domain resource occupied by the received PDSCH and the time-domain resource occupied by the downlink reference signal do not have a same time-domain resource, determine that the downlink reference signal is invalid.

In some possible designs, the processing module 201 is specifically configured to: if a time-domain resource occupied by a received PDSCH and a time-domain resource occupied by the downlink reference signal are in a same slot, determine that the downlink reference signal is valid; and if the time-domain resource occupied by the received PDSCH and the time-domain resource occupied by the downlink reference signal are not in the same slot, determine that the downlink reference signal is invalid.

In some possible designs, the processing module 201 is specifically configured to: if a time-domain resource occupied by a received PDSCH and a time-domain resource occupied by the downlink reference signal are in a first half slot or a second half slot of a same slot, determine that the downlink reference signal is valid; and, if the time-domain resource occupied by the received PDSCH and the time-domain resource occupied by the downlink reference signal belong to the first half slot and the second half slot of the same slot respectively, determine that the downlink reference signal is invalid.

In some possible designs, the processing module 201 is specifically configured to: if a time gap between a last OFDM symbol in a time-domain resource occupied by a detected synchronization signal block and a first OFDM symbol in a time-domain resource occupied by the downlink reference signal is smaller than or equal to a preset time gap, determine that the downlink reference signal is valid; and if the time gap between the last OFDM symbol in the time-domain resource occupied by the detected synchronization signal block and the first OFDM symbol in the time-domain resource occupied by the downlink reference signal is greater than the preset time gap, determine that the downlink reference signal is invalid;

where the preset time gap is determined according to a downlink transmission burst.

In some possible designs, the processing module 201 is specifically configured to: if a time-domain resource occupied by a detected synchronization signal block is continuous with a time-domain resource occupied by the downlink reference signal, determine that the downlink reference signal is valid; and if the time-domain resource occupied by the detected synchronization signal block is not continuous with the time-domain resource occupied by the downlink reference signal, determine that the downlink reference signal is invalid.

In some possible designs, the processing module 201 is specifically configured to: if a time gap between a last OFDM symbol in a time-domain resource occupied by a detected synchronization signal block and a first OFDM symbol in a time-domain resource occupied by the downlink reference signal is smaller than a preset threshold, determine that the downlink reference signal is valid; and if the time gap between the last OFDM symbol in the time-domain resource occupied by the detected synchronization signal block and the first OFDM symbol in the time-domain resource occupied by the downlink reference signal is greater than or equal to the preset threshold, determine that the downlink reference signal is invalid.

In some possible designs, the processing module 201 is specifically configured to: if a time-domain resource occupied by a detected synchronization signal block and a time-domain resource occupied by the downlink reference signal have a time-domain resource that is at least partially same, determine that the downlink reference signal is valid; and if the time-domain resource occupied by the detected synchronization signal block and the time-domain resource occupied by the downlink reference signal do not have a same time-domain resource, determine that the downlink reference signal is invalid.

In some possible designs, the processing module 201 is specifically configured to: if a time-domain resource occupied by a detected synchronization signal block and a time-domain resource occupied by the downlink reference signal are in a same slot, determine that the downlink reference signal is valid; and if the time-domain resource occupied by the detected synchronization signal block and the time-domain resource occupied by the downlink reference signal are not in the same slot, determine that the downlink reference signal is invalid.

In some possible designs, the processing module 201 is specifically configured to: if a time-domain resource occupied by a detected synchronization signal block and a time-domain resource occupied by the downlink reference signal are in a first half slot or a second half slot of a same slot, determine that the downlink reference signal is valid; and if the time-domain resource occupied by the detected synchronization signal block and the time-domain resource occupied by the downlink reference signal are not in the first half slot and the second half slot of the same slot, determine that the downlink reference signal is invalid.

In some possible implementations, the preset time gap is 16 microseconds.

Under some circumstances, the apparatus for processing a downlink reference signal further includes a detecting module 202, where the detecting module 202 may be configured to monitor a PDCCH, receive a PDSCH and monitor a synchronization signal block.

The apparatus for processing a downlink reference signal provided by the present embodiment can be configured to execute the technical solution in any one of method embodiments described above, and the implementation principle and technical effect thereof are similar, which will not be repeated here.

Figure 7:
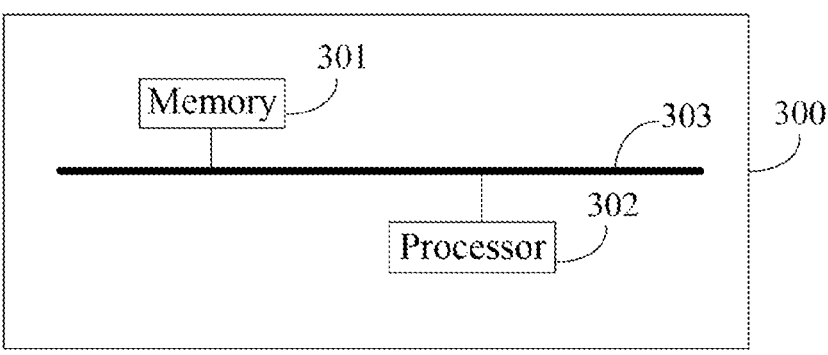
FIG. 7 is a schematic structural diagram of an electronic device provided by an embodiment of the present disclosure.

FIG. 7 is a schematic structural diagram of an electronic device provided by an embodiment of the present disclosure. As shown in FIG. 7, the electronic device 300 provided by the present embodiment includes: a memory 301 and a processor 302;

the memory 301 can be an independent physical unit, which is connected to the processor 302 through a bus 303. The memory 301 and the processor 302 can also be integrated together, and be implemented through hardware, etc.

The memory 301 is used to store a program instruction, and the processor 302 calls the program instruction to perform operations of any one of the above method embodiments of FIG. 2-FIG. 5.

In an embodiment, when part of or all of the methods of the above embodiments are implemented through software, the above apparatus 300 may also only include the processor 302. The memory 301 for storing the program is located outside the apparatus 300, and the processor 302 is connected to the memory 301 through a circuit/wire for reading and executing the programs stored in the memory 301.

The processor 302 may be a central processing unit (CPU), a network processor (NP), or a combination of the CPU and the NP.

The processor 302 may also further include a hardware chip. The above hardware chip can be an application-specific integrated circuit (ASIC), a programmable logic device (PLD) or a combination thereof. The above PLD can be a complex programmable logic device (CPLD), a field-programmable gate array (FPGA), a generic array logic (GAL) or any combination thereof.

The memory 301 may include a volatile memory, such as a random-access memory (RAM); the memory may also include a non-volatile memory, such as a flash memory, a hard disk drive (HDD) or a solid-state drive (SSD); the memory may also include a combination of the above kinds of memories.

Figure 8:
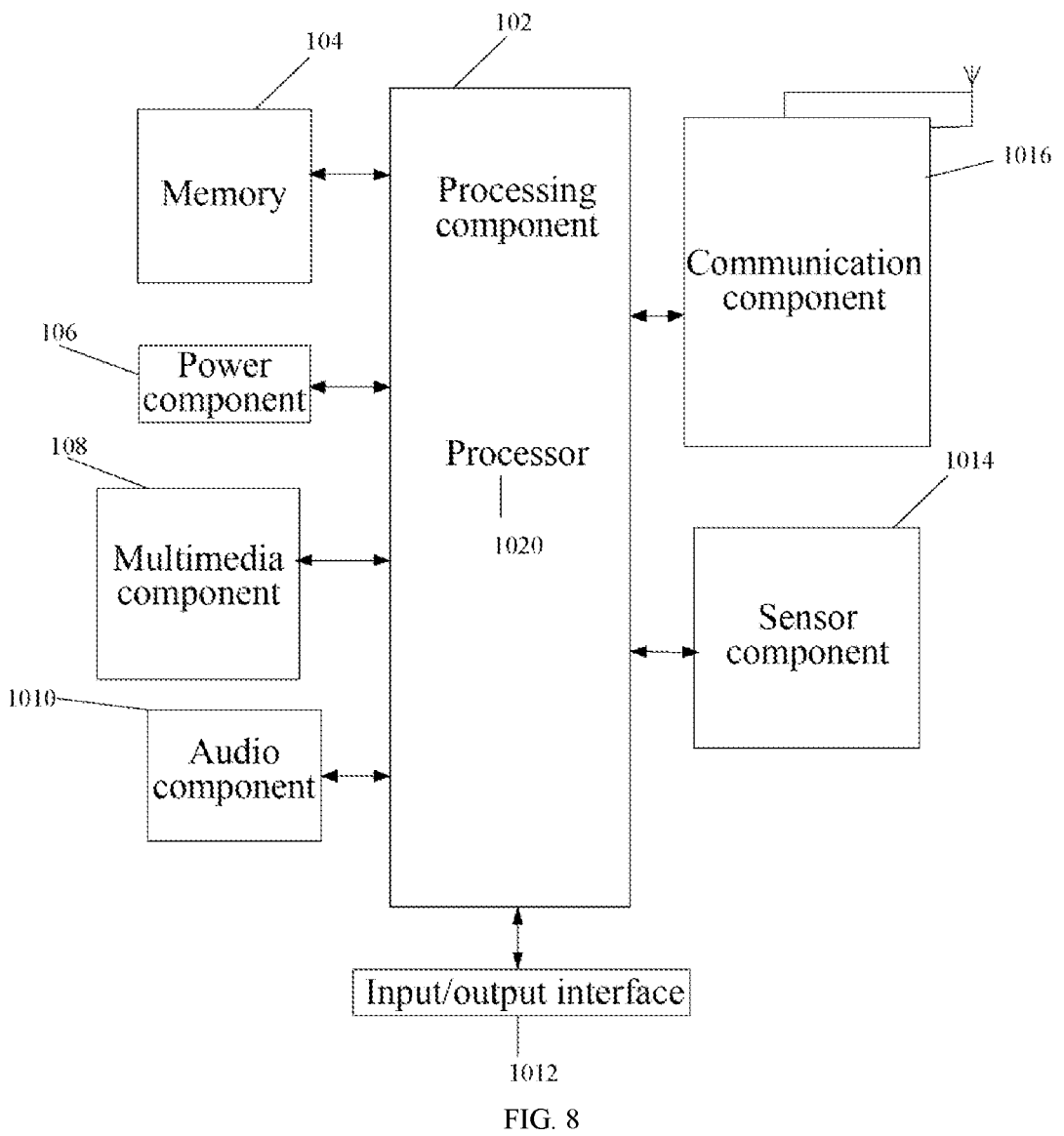
FIG. 8 is a schematic structural diagram of an apparatus for processing a downlink reference signal provided by another embodiment of the present disclosure.

FIG. 8 is a schematic structural diagram of an apparatus for processing a downlink reference signal provided by another embodiment of the present disclosure. The apparatus 1200 for processing a downlink reference signal provided by the present embodiment may be, for example, a computer, a tablet device, a personal digital assistant, etc.

As shown in FIG. 8, the downlink signal processing apparatus 1200 may include the following one or more components: a processing component 102, a memory 104, a power component 106, a multimedia component 108, an audio component 1010, an input/output (I/O) interface 1012, a sensor component 1014, and a communication component 1016.

The processing component 102 generally controls the overall operation of the apparatus 1200 for processing a downlink reference signal, such as operations associated with display, telephone call, data communication, camera operation and recording operation. The processing component 102 may include one or more processors 1020 to execute instructions to complete all or part of the steps of the above method. In addition, the processing component 102 may include one or more modules to facilitate interactions between the processing component 102 and other components. For example, the processing component 102 may include a multimedia module to facilitate interactions between the multimedia component 108 and the processing component 102.

The memory 104 is configured to store various types of data to support the operation of the apparatus 1200 for processing a downlink reference signal. Examples of these data include instructions, contact data, phone book data, messages, pictures, videos, etc., for any application or method operated on the apparatus 1200 for processing a downlink reference signal. The memory 104 can be implemented by any type of volatile or non-volatile memory device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 106 provides power to various components of the apparatus 1200 for processing a downlink reference signal. The power component 106 may include a power management system, one or more power supplies, and other components associated with generating, managing and distributing power for the apparatus 1200 for processing a downlink reference signal.

The multimedia component 108 includes a screen that provides an output interface between the apparatus 1200 for processing a downlink reference signal and the user. In some embodiments, the screen may include a liquid crystal display (LCD) and a touch panel (TP). If the screen includes a touch panel, the screen can be implemented as a touch screen to receive an input signal from a user. The touch panel includes one or more touch sensors to sense touching, sliding and gestures on the touch panel. The touch sensor may not only sense the boundary of a touch or a slide action, but also detect the duration and pressure related to the touch or slide action. In some embodiments, the multimedia component 108 includes a front camera and/or a rear camera. When an apparatus 1200 for processing a downlink reference signal of a target object is in an operating mode, such as a shooting mode or a video mode, the front camera and/or the rear camera can receive external multimedia data. Each front camera and rear camera can be a fixed optical lens system or have a focal length and an optical zoom capability.

The audio component 1010 is configured to output and/or input audio signals. For example, the audio component 1010 includes a microphone (MIC) configured to receive external audio signals when the apparatus 1200 for processing a downlink reference signal is in operation modes, such as a call mode, a recording mode and a voice recognition mode. The received audio signal may be further stored in the memory 104 or transmitted via the communication component 1016. In some embodiments, the audio component 1010 also includes a speaker for outputting audio signals.

The I/O interface 1012 provides an interface between the processing component 102 and peripheral interface modules, such as a keyboard, a click wheel, buttons, etc. These buttons can include, but are not limited to: a home button, a volume button, a start button and a lock button.

The sensor component 1014 includes one or more sensors, which are used to provide various aspects of state evaluation for the apparatus 1200 for processing a downlink reference signal. For example, the sensor component 1014 can detect the on/off state of the apparatus 1200 for processing a downlink reference signal, the relative positioning of components, such as the display and keypad of the apparatus 1200 for processing a downlink reference signal, the sensor component 1014 can also detect the position change of the apparatus 1200 for processing a downlink reference signal or a component of the apparatus 1200 for processing a downlink reference signal, the presence or absence of the user's contact with the apparatus 1200 for processing a downlink reference signal, the orientation or acceleration/deceleration of the apparatus 1200 for processing a downlink reference signal and the temperature change of the apparatus 1200 for processing a downlink reference signal. The sensor component 1014 may include a proximity sensor, configured to detect the presence of nearby objects without any physical contact. The sensor component 1014 can also include optical sensors, such as CMOS or CCD image sensors, for use in imaging applications. In some embodiments, the sensor component 1014 may also include an acceleration sensor, a gyroscope sensor, a magnetic sensor, a pressure sensor or a temperature sensor.

The communication component 1016 is configured to facilitate wired or wireless communication between the apparatus 1200 for processing a downlink reference signal and other devices. The apparatus 1200 for processing a downlink reference signal can access a wireless network based on communication standards, such as WiFi, 2G or 3G or 4G, or their combination. In an exemplary embodiment, the communication component 1016 receives a broadcast signal or broadcast related information from an external broadcast management system via a broadcast channel. In an exemplary embodiment, the communication component 1016 may also include a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the apparatus 1200 for processing a downlink reference signal can be implemented by one or more application specific integrated circuits (ASIC), digital signal processors (DSP), digital signal processing devices (DSPD), programmable logic devices (PLD), field programmable gate arrays (FPGA), controllers, micro-controllers, micro-processors or other electronic components, and is used to perform the above-mentioned methods.

The present disclosure also provides a computer-readable storage medium, where the computer-readable storage medium includes a program, and the program, when executed by a processor, performs the method for processing a downlink reference signal of any of the above embodiments.

Those of ordinary skills in the art can understand that all or part of the steps to realize the above-mentioned method embodiments can be completed by hardware related to program instructions. The above mentioned program can be stored in a computer-readable storage medium. When the program is executed, the steps including the above method embodiments are executed; the above mentioned storage medium includes an ROM, an RAM, a magnetic disk, an optical disk or other medium that can store program codes.

Finally, it should be noted that the above embodiments are only used to illustrate the technical solution of the present disclosure, but not to limit it; although the disclosure has been described in detail with reference to the above mentioned embodiments, those skilled in the art should understand that they can still modify the technical solutions described in the above mentioned embodiments, or equivalently replace some or all of the technical features; these modifications or substitutions do not make the essence of the corresponding technical solutions depart from the scope of the technical solutions of the embodiments of the present disclosure.

The invention claimed is:

1. A method for processing a downlink reference signal, comprising:

determining that the downlink reference signal is invalid;

wherein the determining that the downlink reference signal is invalid comprises:

if a time-domain resource occupied by a received physical downlink share channel PDSCH and a time-domain resource occupied by the downlink reference signal do not overlap in the time-domain resource, determining that the downlink reference signal is invalid.

2. The method according to claim 1, wherein the determining that the downlink reference signal is invalid further comprises:

if the time gap between the last OFDM symbol in the time-domain resource occupied by the detected PDCCH and the first OFDM symbol in the time-domain resource occupied by the downlink reference signal is greater than the preset time gap, determining that the downlink reference signal is invalid;

wherein the preset time gap is determined according to a downlink transmission burst.

3. The method according to claim 1, wherein the determining that the downlink reference signal is invalid further comprises:

if the time-domain resource occupied by the detected PDCCH is not continuous with the time-domain resource occupied by the downlink reference signal, determining that the downlink reference signal is invalid.

4. The method according to claim 1, wherein the determining that the downlink reference signal is invalid further comprises:

if the time gap between the last OFDM symbol in the time-domain resource occupied by the detected PDCCH and the first OFDM symbol in the time-domain resource occupied by the downlink reference signal is greater than or equal to the preset threshold, determining that the downlink reference signal is invalid.

5. The method according to claim 1, wherein the determining that the downlink reference signal is invalid further comprises:

if the time-domain resource occupied by the detected PDCCH and the time-domain resource occupied by the downlink reference signal do not have a same time-domain resource, determining that the downlink reference signal is invalid.

6. The method according to claim 1, wherein the determining that the downlink reference signal is invalid further comprises:

if the time-domain resource occupied by the detected PDCCH and the time-domain resource occupied by the downlink reference signal are not in the same slot, determining that the downlink reference signal is invalid.

7. The method according to claim 1, wherein the determining that the downlink reference signal is invalid further comprises:

if the time-domain resource occupied by the detected PDCCH and the time-domain resource occupied by the downlink reference signal are not in the first half slot or the second half slot of the same slot, determining that the downlink reference signal is invalid.

8. The method according to claim 1, wherein the determining that the downlink reference signal is invalid further comprises:

if the time gap between the last OFDM symbol in the time-domain resource occupied by the received PDSCH and the first OFDM symbol in the time-domain resource occupied by the downlink reference signal is greater than the preset time gap, determining that the downlink reference signal is invalid;

wherein the preset time gap is determined according to a downlink transmission burst.

9. The method according to claim 1, wherein the determining that the downlink reference signal is invalid further comprises:

if the time-domain resource occupied by the received PDSCH is not continuous with the time-domain resource occupied by the downlink reference signal, determining that the downlink reference signal is invalid.

10. The method according to claim 1, wherein the determining that the downlink reference signal is invalid further comprises:

if the time gap between the last OFDM symbol in the time-domain resource occupied by the received PDSCH and the first OFDM symbol in the time-domain resource occupied by the downlink reference signal is greater than or equal to the preset threshold, determining that the downlink reference signal is invalid.

11. The method according to claim 1, wherein the determining that the downlink reference signal is invalid further comprises:

if the time-domain resource occupied by the received PDSCH and the time-domain resource occupied by the downlink reference signal are not in the same slot, determining that the downlink reference signal is invalid.

12. The method according to claim 1, wherein the determining that the downlink reference signal is invalid further comprises:

if the time-domain resource occupied by the received PDSCH and the time-domain resource occupied by the downlink reference signal belong to the first half slot and the second half slot of the same slot respectively, determining that the downlink reference signal is invalid.

13. The method according to claim 1, wherein the determining that the downlink reference signal is invalid further comprises:

if the time gap between the last OFDM symbol in the time-domain resource occupied by the detected synchronization signal block and the first OFDM symbol in the time-domain resource occupied by the downlink reference signal is greater than the preset time gap, determining that the downlink reference signal is invalid;

wherein the preset time gap is determined according to a downlink transmission burst.

14. The method according to claim 1, wherein the determining that the downlink reference signal is invalid further comprises:

if the time-domain resource occupied by the detected synchronization signal block is not continuous with the time-domain resource occupied by the downlink reference signal, determining that the downlink reference signal is invalid.

15. The method according to claim 1, wherein the determining that the downlink reference signal is invalid further comprises:

if the time gap between the last OFDM symbol in the time-domain resource occupied by the detected synchronization signal block and the first OFDM symbol in the time-domain resource occupied by the downlink reference signal is greater than or equal to the preset threshold, determining that the downlink reference signal is invalid.

16. An apparatus for processing a downlink reference signal, comprising:

a memory, a processor and a computer program instruction, the memory stores the computer program instruction;

the processor executes the computer program instruction to: determine that the downlink reference signal is invalid;

wherein the determine that the downlink reference signal is invalid comprises:

if a time-domain resource occupied by a received physical downlink share channel PDSCH and a time-domain resource occupied by the downlink reference signal do not overlap in the time-domain resource, determining that the downlink reference signal is invalid.

17. A non-transitory readable storage medium, comprising: a program;

when the program is executed by a processor, the following method is performed:

determining that a downlink reference signal is invalid;

wherein the determining that the downlink reference signal is invalid comprises:

if a time-domain resource occupied by a received physical downlink share channel PDSCH and a time-domain resource occupied by the downlink reference signal do not overlap in the time-domain resource, determining that the downlink reference signal is invalid.

* * * * *